M. W. Baldwin,
Piston-Rod Connection.
No. 1,904. Patented Dec. 17, 1840.

2 Sheets—Sheet 1.

M. W. Baldwin,
Piston-Rod Connection.
N° 1,904.   Patented Dec. 17, 1840.

UNITED STATES PATENT OFFICE.

MATTHIAS W. BALDWIN, OF PHILADELPHIA, PENNSYLVANIA.

MODE OF CONNECTING PISTON-RODS WITH THE PISTONS OF STEAM-CYLINDERS.

Specification of Letters Patent No. 1,904, dated December 17, 1840.

*To all whom it may concern:*

Be it known that I, MATTHIAS W. BALDWIN, of the city of Philadelphia, in the State of Pennsylvania, have invented an improvement in the manner of connecting the piston-rod with the pistons of steam-cylinders, of pumps, of blowing-machines, and of other engines in which the cylinder is to be double-acting; and I do hereby declare that the following is a full and exact description thereof.

The object of my improvement is, by dispensing with the guides as commonly used, and with the pitman, or rod, usually employed to connect the crank, or working beam, with the piston rod, and which in confined situations cannot be made of sufficient length to be advantageously employed, to combine the pitman and piston-rod in one, by which the whole length of the piston-rod is, in effect, added to the pitman.

In carrying my improvement into effect, I connect the outer end of the piston-rod, by means of a joint pin, directly, to a crank, or to a vibrating beam, or lever, as the case may be; and the inner end thereof I likewise connect to the piston, by means of a joint pin; by which device the piston-rod is allowed to vibrate laterally to that extent which may be necessary for the throw of the crank, or of the curve formed by the motion of the beam, or lever. In the upper, or outer, head of the cylinder I make a longitudinal slot, or opening, of sufficient length to admit of the lateral vibration of the piston-rod, resulting from its mode of connection, and this slot, or opening, I cover with a jointed hub, or with a slide, and connect the same with a stuffing box to embrace the piston; constructing these parts in such manner as to keep them, steam, water, and air, tight, while the necessary freedom of motion is allowed. The mode of constructing and arranging the jointed hub, or the slide, and of the parts connected with it will admit of considerable variation, but the subjoined exemplifications will fully point out the principle upon which the operation of my improved apparatus is dependent.

Figures 1, 2:
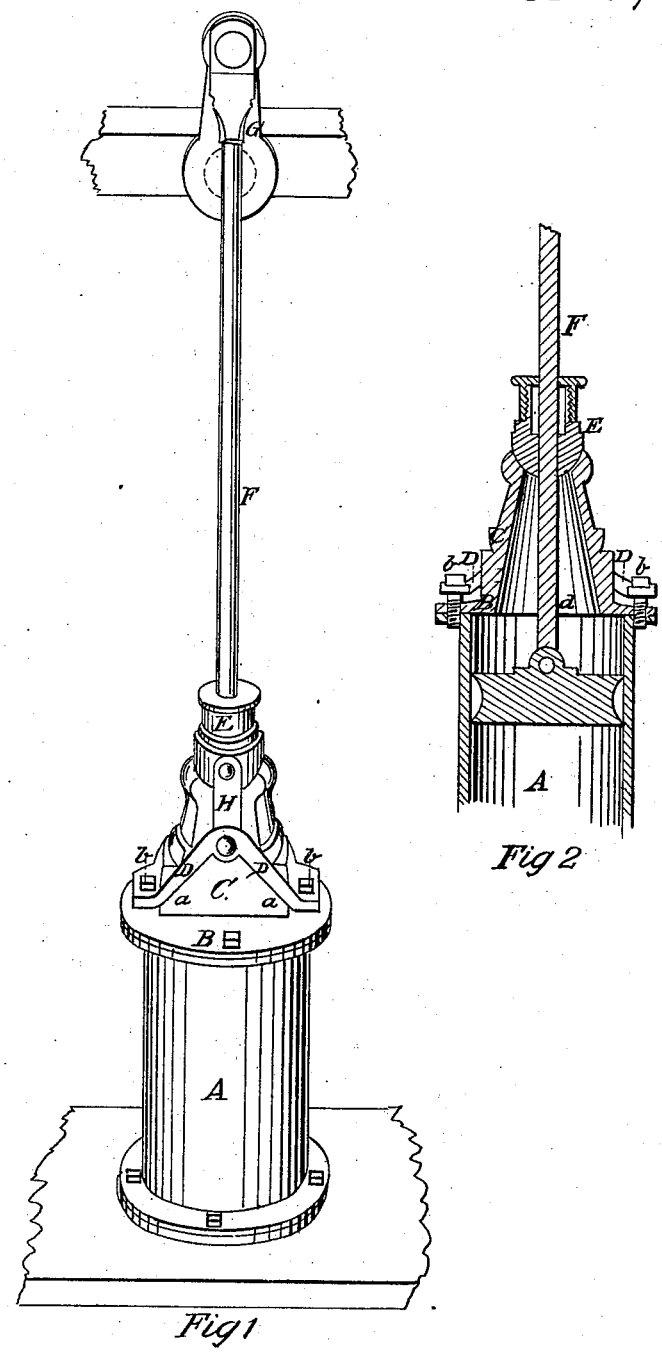

In Figure 1, in the accompanying drawing, I have shown the manner in which I sometimes connect a jointed hub with the head of the cylinder and with the stuffing box through which the piston-rod passes. A, is the cylinder, and B, its upper, or outer, head. C, is the jointed hub, which is so formed at the end which is in contact with the head of the cylinder as to constitute with it a knuckle, or rather a ball and socket joint, this latter being much preferred; the projecting part *a, a*, on the head of the cylinder making one half of this joint. D, D, is a stirrup by which the hub is confined in place, there being tightening screws *b, b*, for drawing it down to a close joint. E, is a stuffing box through which the piston-rod F, passes, the outer end of which is shown as jointed to the crank G. The stuffing box E, is fitted to the hub by a ball and socket joint; it has on each of its sides a strap H, connected to it by joint pins at its center of motion, and carrying joint pins *c*, at its lower end, upon which the stirrup D, D, bears; these latter pins constituting the center of motion of the hub. By this arrangement, the tightening screws *b, b*, act equally upon the hub, and upon the stuffing box. The hub C, as well as the head B, has an opening through it to admit the piston rod, which opening is widened out to allow of the lateral motion of said piston.

Fig. 2, is a section through a part of the cylinder and piston, and through the hub and its appendages; the shaded portion *d, d*, represents the lateral space in the hub and head for the vibration of the piston-rod, which rod is shown as jointed to the piston at *e*. In this figure, the respective parts are designated by the same letters as in Fig. 1.

Figures 3, 4:
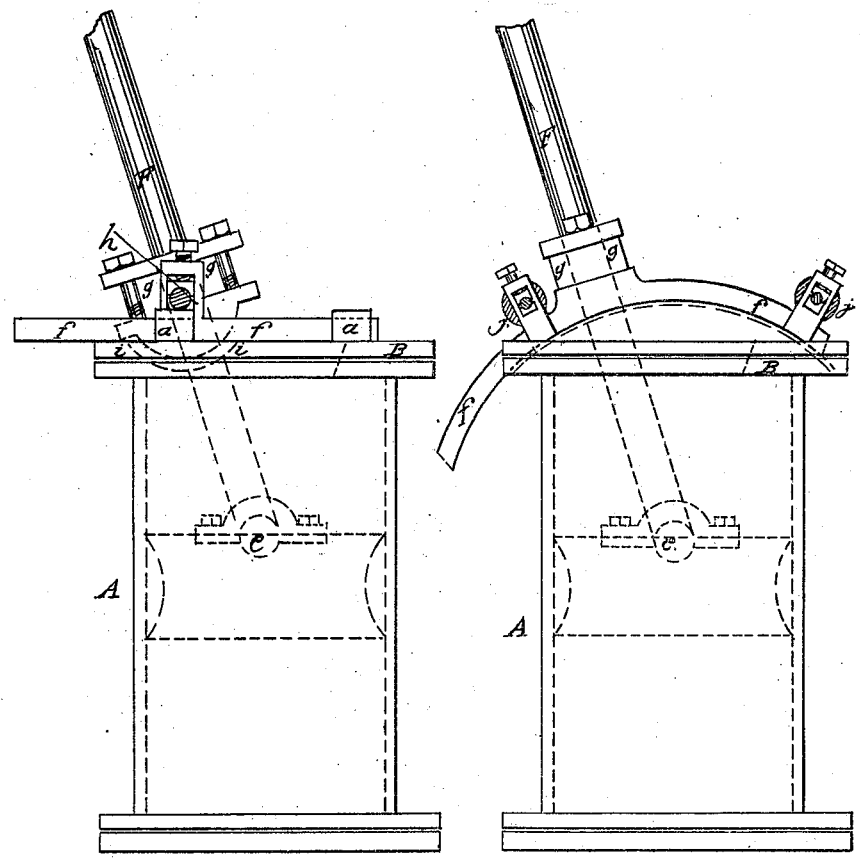

I have thus shown the plan of carrying out my improvement, which I consider the best, and I will now describe two other modifications thereof that will answer a like purpose, and that will serve to exemplify the variation of which the principle is susceptible. In Fig. 3, *f, f*, is a straight slide which covers the slot or opening, in the head of the cylinder, of sufficient length to allow of the vibration of the piston-rod. this slide may be held down by staples, or clips, *a, a*, and may traverse against friction rollers: *g, g*, is a stuffing box attached to the slide *f*, by trunnions *h*, and having its lower side *i, i*, curved, and filled to work air-tight in the slide. A slide of this kind may be fitted to the under side of the cylinder head, and it will then be held close against its bearings by the pressure of the steam, but it will, in this case, be subjected to greater friction and this arrangement is not, therefore, preferred.

Fig. 4, represents another modification of the slide $f, f$, wherein it is bent so as to form a segment of a circle, its seat on the cylinder head being convex, and the two being ground together, and thus made to fit perfectly close. This slide is represented as borne down by friction rollers $j, j$; the stuffing-box $g, g$, may, under this arrangement, be fixed firmly to the slide, the center of the curvature of this being the middle of the piston, the angular variation will not be such as to produce cramping, more particularly when a lever beam is used; but the stuffing box may be hung on trunnions, or be made to consist of a segment of a ball, and work in a socket, if preferred.

Having thus fully described the nature of my improvement, and shown the manner in which the same operates, what I claim as my invention, and desire to secure by Letters Patent, is—

The attaching of the piston-rod of a double acting steam, water, blowing, or other, engine, directly to a lever beam, or crank, at one end, and to the piston at the other, causing the said piston-rod to pass through a stuffing-box connected with a jointed hub, or with a slide, so formed and arranged as to admit of the lateral vibration of the piston-rod, substantially in the manner herein set forth.

MATTHIAS W. BALDWIN.

Witnesses:
 THOS. BARTON,
 WILLIAM OSBORNE.